United States Patent
Nishida

(10) Patent No.: US 6,707,897 B2
(45) Date of Patent: *Mar. 16, 2004

(54) PRIVATE BRANCH EXCHANGE

(75) Inventor: Toshio Nishida, Hino (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,585

(22) PCT Filed: Mar. 13, 1998

(86) PCT No.: PCT/JP98/01059
§ 371 (c)(1),
(2), (4) Date: Nov. 12, 1998

(87) PCT Pub. No.: WO98/41042
PCT Pub. Date: Sep. 17, 1998

(65) Prior Publication Data
US 2002/0048358 A1 Apr. 25, 2002

(30) Foreign Application Priority Data
Mar. 13, 1997 (JP) .............................. 9-058676

(51) Int. Cl.$^7$ .............................................. H04M 3/00
(52) U.S. Cl. ...................... 379/188; 379/198; 379/229; 379/231; 379/234
(58) Field of Search ................................ 379/142, 225, 379/127, 201, 204, 142.01, 142.02, 142.09, 210.02, 210.03, 188, 198

(56) References Cited

U.S. PATENT DOCUMENTS 5,161,181 A * 11/1992 Zwick ........................ 379/88.2
5,412,711 A 5/1995 Hayashi .................... 379/88.19

(List continued on next page.)

FOREIGN PATENT DOCUMENTS

JP 2-192395 7/1990
JP 3-72760 3/1991

(List continued on next page.)

OTHER PUBLICATIONS

Bellcore Technical Reference TR–TSY–000031, Issue 2, Jun. 1988. CLASS Feature: Calling Number Delivery pp. 3–12.

* cited by examiner

*Primary Examiner*—Bing Bui
(74) *Attorney, Agent, or Firm*—Finnegan, Henderson, Farabow, Garrett & Dunner, L.L.P.

(57) ABSTRACT

A private branch exchange comprising means, including at least an extension terminal, for connecting the extension terminal to a communication network, means for transmitting to the communication network a call including information relating to a caller number, when a transmission call is made from the extension terminal, means for sending, when a call is received from the communication network and the call includes information on a number, the call to the extension terminal corresponding to the called number, memory means for storing information on a predetermined number which is preconfirmed to function as a called number for callback, determination means for determining, when a call has been received from the extension terminal, whether or not the predetermined number is obtained, which corresponds to a caller number received from the extension terminal or a caller number corresponding to the extension number, with use of the information stored in the memory means, and means for employing, when the acquisition of the called number has been determined by the determination means, the predetermined number as a caller number and transmitting transmission call information including information relating to the caller number to the communication network.

16 Claims, 7 Drawing Sheets

U.S. PATENT DOCUMENTS

| | | | |
|---|---|---|---|
| 5,475,744 A | 12/1995 | Ikeda | 379/127 |
| 5,521,969 A | 5/1996 | Paulus et al. | 379/142 |
| 5,590,184 A | 12/1996 | London | 379/142 |
| 5,764,748 A | 6/1998 | Rosenthal et al. | 379/215 |
| 5,832,072 A | 11/1998 | Rozenblit | 379/246 |
| 5,859,904 A | 1/1999 | Huang | 379/219 |
| 5,864,612 A * | 1/1999 | Strauss et al. | 379/142.03 |
| 5,901,209 A | 5/1999 | Tannenbaum et al. | 379/142 |
| 5,937,052 A | 8/1999 | Cook-Hellberg | 379/219 |
| 5,953,399 A | 9/1999 | Farris et al. | 379/201 |
| 6,252,953 B1 * | 6/2001 | Gruchala et al. | 379/207.02 |

FOREIGN PATENT DOCUMENTS

| | | | | |
|---|---|---|---|---|
| JP | 4-180494 | 6/1992 | | |
| JP | 4-342351 | 11/1992 | | |
| JP | 06-284198 | * 7/1994 | | |
| JP | 6-284198 | 10/1994 | | |
| JP | 406284198 A | 10/1994 | | H04M/3/42 |
| JP | 7-111538 | 4/1995 | | |
| JP | 407111538 A | 4/1995 | | H04M/3/42 |

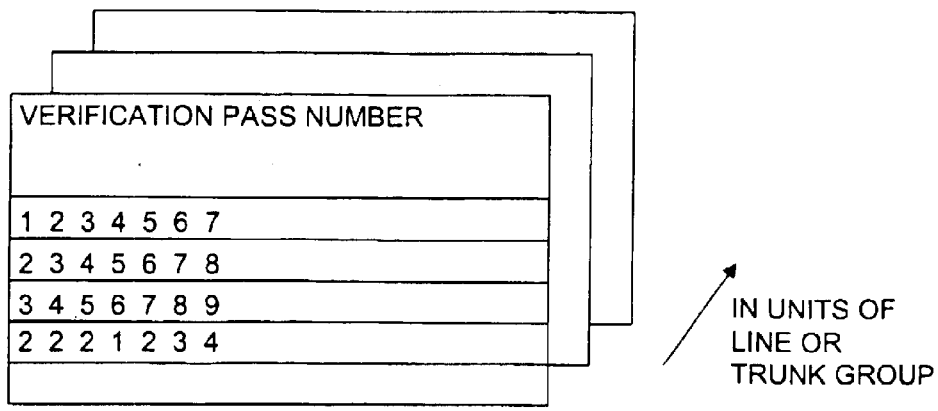
FIG. 10
LCD DISPLAY EXAMPLE OF NUMBER
OF PRESENTATION RESTRICTION
LCD IN CASE OF PRESENTATION
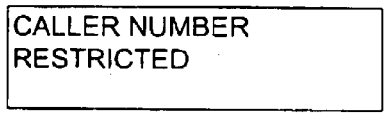
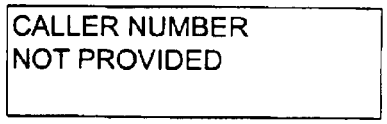
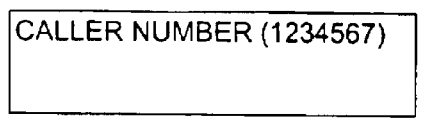
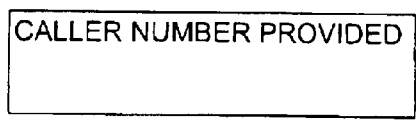
FIG. 11A  FIG. 11B

PRIVATE BRANCH EXCHANGE

TECHNICAL FIELD

The present invention relates to a private branch exchange having a caller number informing function and a caller number information restricting function or having a connected party number informing function and a connected party number information restricting function.

BACKGROUND ART

In an integrated services digital network (ISDN), a caller number informing function and a called number information restricting function are defined, and a private branch exchange having a function of informing a caller number has already been developed. The caller number informing function is provided so that a called party can identify the calling party and, if necessary, can call back with use of the informed caller number. In the public integrated services digital network (ISDN), too, the caller number provided along with a call setting signal at the time of calling is verified on condition that a callback can be made. If the caller number is determined to be improper in the verification by the network, the improper caller number is replaced with a proper caller number and transmitted to the destination apparatus. In the network, caller numbers are managed in units of an interface (i.e., an office line or a plurality of office lines capable of being controlled by one control channel).

In order to carry out the caller number informing function, a data structure, for example, as shown in FIG. 1, is adopted. In FIG. 1, whether or not the caller number is informed is determined as follows. A caller number information element identifier in OCTET1 (8-bit data) is referred to in order to determine whether there is data on the caller number. If there is the caller number data, the caller number data is read from OCTET4. In this manner, the caller number is informed to the called party. The caller number data in OCTET4 is character-string data.

The caller number informing function will be further described. FIG. 2 schematically shows a process 40 for the caller number in the conventional private branch exchange. A call signal 41 from an extension may be an analog signal or a digital signal, depending on the type of the extension. On the basis of a caller number 42 associated with the extension held within the private branch exchange, a process 43 for associating the caller number 42 with the call signal is performed. A call signal 44 to the network is termed "call setting" in the integrated services digital network and it includes the caller number 45. The counter-side terminal 46 receives a call via the integrated services digital network and includes a display 47.

In FIG. 2, if the private branch exchange has received the call signal 41 from the extension, it associates the call signal 41 with the caller number 42 stored therein and corresponding to the extension. When the private branch exchange sends the call signal 44, it incorporates the caller number 45 into the call signal 44. The destination apparatus 46 which has received the call displays the caller number on the display 47 and identifies the caller. Using this number, a callback is made. In a case where the extension is one matching the integrated services digital network, the caller number may be contained in the call signal 41 and informed from the extension.

According to standards or recommendations specifying the protocols of the integrated services digital network, it is verified by the network, from a standpoint of security, whether the caller number 45 coincides with a contractual number. If the caller number does not coincide, it may be replaced with the contractual number on the network.

On the other hand, a service called "direct dial-in" is provided, wherein if a callback is made or a general call is received from the network, the extension for the call reception is determined on the basis of the content of the called number information element included in the call setting signal for the call reception.

FIG. 3 schematically shows a direct dial-in process 50 in the conventional private branch exchange. A called number conversion table 51 converts the called number to the extension number in order to carry out the direct dial-in. The called number conversion table 51 is provided for each interface (an office line or office lines controllable by one control channel). The call reception signal 52 from the network is termed "call setting" in the integrated services digital network and includes the called number 53. The called number conversion table 51 is searched on the basis of the called number 53, and the extension number 54 of the called party is obtained. The call reception signal 55 to the extension number 54 may be an analog signal or a digital signal, depending on the kind of the extension.

In FIG. 3, if the call reception signal 52 is received from the network, the private branch exchange obtains the extension number 54 of the called party on the basis of the called number 53 included in the private exchange, with use of the called number conversion table 51 provided within the exchange. Then the private branch exchange sends out the call reception signal 55. Thereby, the call is connected to the extension corresponding to the called number.

In general, the private branch exchange accommodates more extension terminals than called numbers which can be received from the network. Thus, all extensions are not assigned called numbers, nor can automatically receive calls. There are many extension terminals which cannot directly receive calls from the integrated services digital network.

When such an extension transmits a call with use of the integrated services digital network, a callback cannot be made. Thus, the caller number information element which can identify the extension cannot be sent to the network. In such a case, the caller number is supplemented by the network. In the case of the private branch exchange, however, no callback can be made to the extension, which actually transmitted the call, with the supplemented number. In this case, a caller number presentation restriction should have been sent to the network to prevent the counter-side terminal from being provided with the caller number, but this is not done.

Moreover, in general, in the private branch exchange having the function of informing the caller number, the caller numbers permitting callback are preset in the extension terminal or in the private branch exchange. In the private branch exchange, in a case where the extension always selects a specified office line to make a call, if the caller number is properly set, the call passes the network verification and reaches the counter-side terminal. It is usual, however, in the private branch exchange that use is made of an office line selection function for selecting a most inexpensive office line or selecting a non-busy office line when a certain office line is busy. In this case, if the extension issues a call by selecting an office line different from an ordinary one, the caller number which is proper in the ordinarily selected office line is determined to be improper in the different office line by the network verification. As a result, a default number in the network is supplemented and transmitted to the counter-side terminal.

As stated above, in the conventional private branch exchange, it is difficult to easily inform the caller number with which a callback can actually be made. If the office line selection function is used, the number, which is proper in ordinary cases, may become improper. It is very difficult to take such flexible measures as informing the caller number with which a callback can actually be made, or sending a caller number presentation restriction to the network in a case where the proper caller number cannot be informed.

In the conventional private branch exchange, as described above, services have not been informed from the standpoint as to whether or not a callback can be made, when the caller number is informed or the presentation restriction is sent. There is a concern that a caller number, with which a callback cannot be made, is informed to the counter-side party.

DISCLOSURE OF INVENTION

The object of the present invention is to provide a private branch exchange capable of informing a caller number with which a callback can actually be made, or positively informing a caller number presentation restriction to the network when the caller number with which the callback can actually be made cannot be informed, thereby preventing the network from supplementing a caller number which is invalid for the callback.

A private branch exchange according to the present invention comprising: means, including at least an extension terminal, for connecting the extension terminal to a communication network; means for transmitting to the communication network a call including information relating to a caller number, when a transmission call is made from the extension terminal; means for sending, when a call is received from the communication network and the call includes information on a number, the call to the extension terminal corresponding to the called number; memory means for storing information on a predetermined number which is preconfirmed to function as a called number for callback; determination means for determining, when a call has been received from the extension terminal, whether or not the predetermined number is obtained, which corresponds to a caller number received from the extension terminal or a caller number corresponding to the extension number, with use of the information stored in the memory means; and means for employing, when the acquisition of the called number has been determined by the determination means, the predetermined number as a caller number and transmitting transmission call information including information relating to the caller number to the communication network. The same structure may be adopted in a case where the extension terminal has responded to a reception call. Specifically, a private branch exchange comprising: means, including at least an extension terminal, for connecting the extension terminal to a communication network; means for transmitting to the communication network a call including information relating to a connected party number, when the extension terminal has responded to a reception call; means for sending, when a call is received from the communication network and the call includes information on a reception number, the call to the extension terminal corresponding to the called number; memory means for storing information on a predetermined number which is preconfirmed to function as a called number for callback; determination means for determining, when a call has been received from the extension terminal, whether or not the predetermined number is obtained, which corresponds to a connected party number received from the extension terminal or a connected party number corresponding to the extension number, with use of the information stored in the memory means; and means for employing, when the acquisition of the called number has been determined by the determination means, the predetermined number as a connected party number and transmitting response information including information relating to the connected party number to the communication network. It is preferable that the private branch exchange according to claim 1 further comprise means for sending a caller number presentation restriction to the communication network, when the determination means has determined that the predetermined number cannot be obtained, which corresponds to a caller number (connected party number) received from the extension terminal or a caller number (connected party number) corresponding to the extension number. With this structure, a caller number (connected party number), with which a callback can actually be made, can be informed to the counter-side terminal.

Preferred embodiments of the private branch exchange of the present invention are as follows:

(1) The memory means stores called number information as the predetermined number, and information for converting the called number information to a corresponding called party extension number or called number, and the determination means determines, when a call has been transmitted from the extension terminal (when the extension terminal has responded to a reception call), whether or not a called number is obtained, which corresponds to a caller number (a connected party number) received from the extension terminal or a caller number (a connected party number) corresponding to the extension number, with use of the information stored in the memory means. The private branch exchange further comprises means for sending a caller number (connected party number) presentation restriction to the communication network, when the determination means has determined that the called number cannot be obtained, which corresponds to a caller number (a connected party number) received from the extension terminal or a caller number (a connected party number) corresponding to the extension number. With this structure, an already provided memory means may be used without providing a new memory means, and this is practically advantageous.

(2) The memory means stores information relating to a caller number (a connected party number) permitted in the communication network as the predetermined number, and the determination means determines, when a call has been transmitted from the extension terminal (when the extension terminal has responded to a reception call), whether or not a caller number (a connected party number), which corresponds to a caller number received from the extension terminal or a caller number (a connected party number) corresponding to the extension number, is a caller number (a connected party number) permitted in the communication network, with use of the information stored in the memory means. The private branch exchange further comprises means for sending a caller number (connected party number) presentation restriction to the communication network, when the determination means has determined that the called number, which corresponds to a caller number (a connected party number) received from the extension terminal or a caller number (a connected party number) corresponding to the extension number, is not the permitted caller number (connected party number).

(3) In the above structure, at least an exclusive line is included, the determination means determines whether or not a called number, which corresponds to a caller number (a connected party number) received from the exclusive line or a caller number (a connected party number) corresponding to the exclusive line, can be obtained with respect to the caller number (connected party number) when a call is sent from the exclusive line to the communication network, and if the determination means has determined that the called number is obtained with the transmission means, the called number corresponding to a caller number (a connected party number) received from the extension terminal or a caller number (a connected party number) corresponding to the extension number is employed as the caller number (connected party number) and transmission call information including information relating to the caller number (connected party number) is transmitted to the communication network. Since the means for informing the caller number or connected party number is provided, it is possible to positively inform a caller number presentation restriction to the network, thereby preventing the network from supplementing a caller number which is invalid for the callback.

According to the present invention, it is possible with a simple structure to extract a caller number with which a callback can actually be made, and to prevent a caller number, with which a callback cannot be made, from being sent to the counter-side terminal in a case where the caller number permitting the callback cannot be extracted.

Moreover, according to the present invention, the following problem can be prevented: even in a case where caller numbers positively associated with extension numbers are transmitted to the network, if an office line different from an ordinary one is selected by an office line select function of the private branch exchange, a caller number which is correct on an ordinarily used office line may be restricted by a network verification function, or if a caller number is supplemented by the network and received by the counter-side terminal, a caller number which is unavailable for callback may be transmitted.

In a private branch exchange including at least a public line and having a function of interconnecting public lines automatically or manually, a caller number presentation restriction may be sent to a public line performing out-connection, irrespective of the presence/absence and content of a caller number received from an in-connection side public line, or when a public line performing out-connection has responded a reception call, a connected party number presentation restriction is sent to an in-connection side public line, irrespective of the presence/absence and content of a connected party number received from the public line. In this case, presentation of all caller numbers (connected party numbers) is restricted. Thus, in this case, too, the problem in which the caller number unavailable for callback is erroneously transmitted can be prevented, as in the above case.

BRIEF DESCRIPTION OF DRAWINGS

FIG. 10 shows an example of the structure of a caller number verification table; and FIGS. 11A and 11B show examples of display images on the display of the receiving terminal in a case of presentation restriction.

BEST MODE OF CARRYING OUT THE INVENTION

Figure 1:
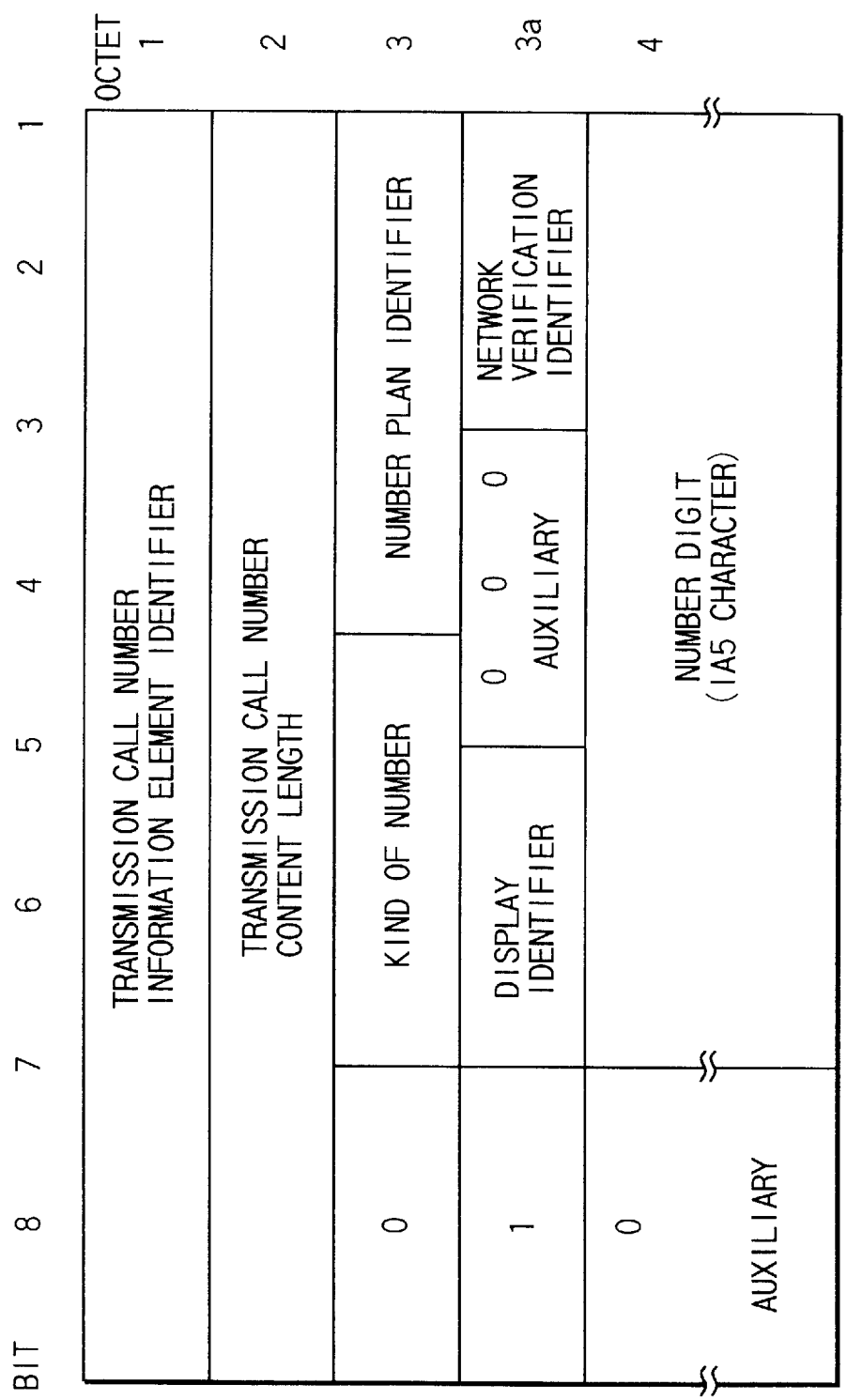
FIG. 1 shows a data structure for performing a caller number informing function.
Figure 2:
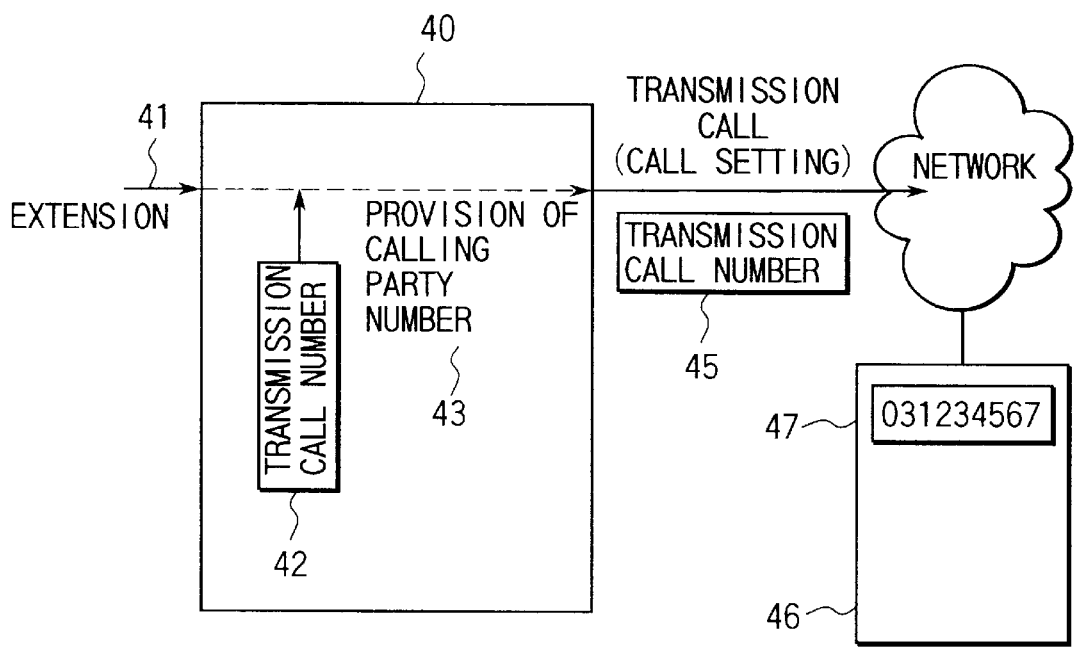
FIG. 2 is a diagram illustrating a caller number process in a conventional private branch exchange.
Figure 3:
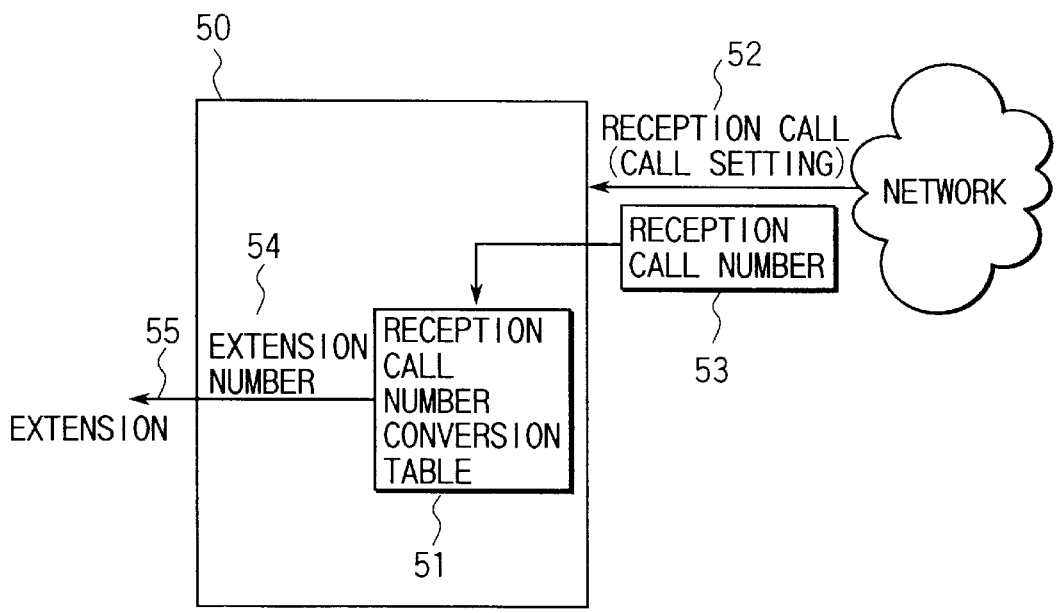
FIG. 3 is a diagram illustrating a direct dial-in process in the conventional private branch exchange.
Figure 4:
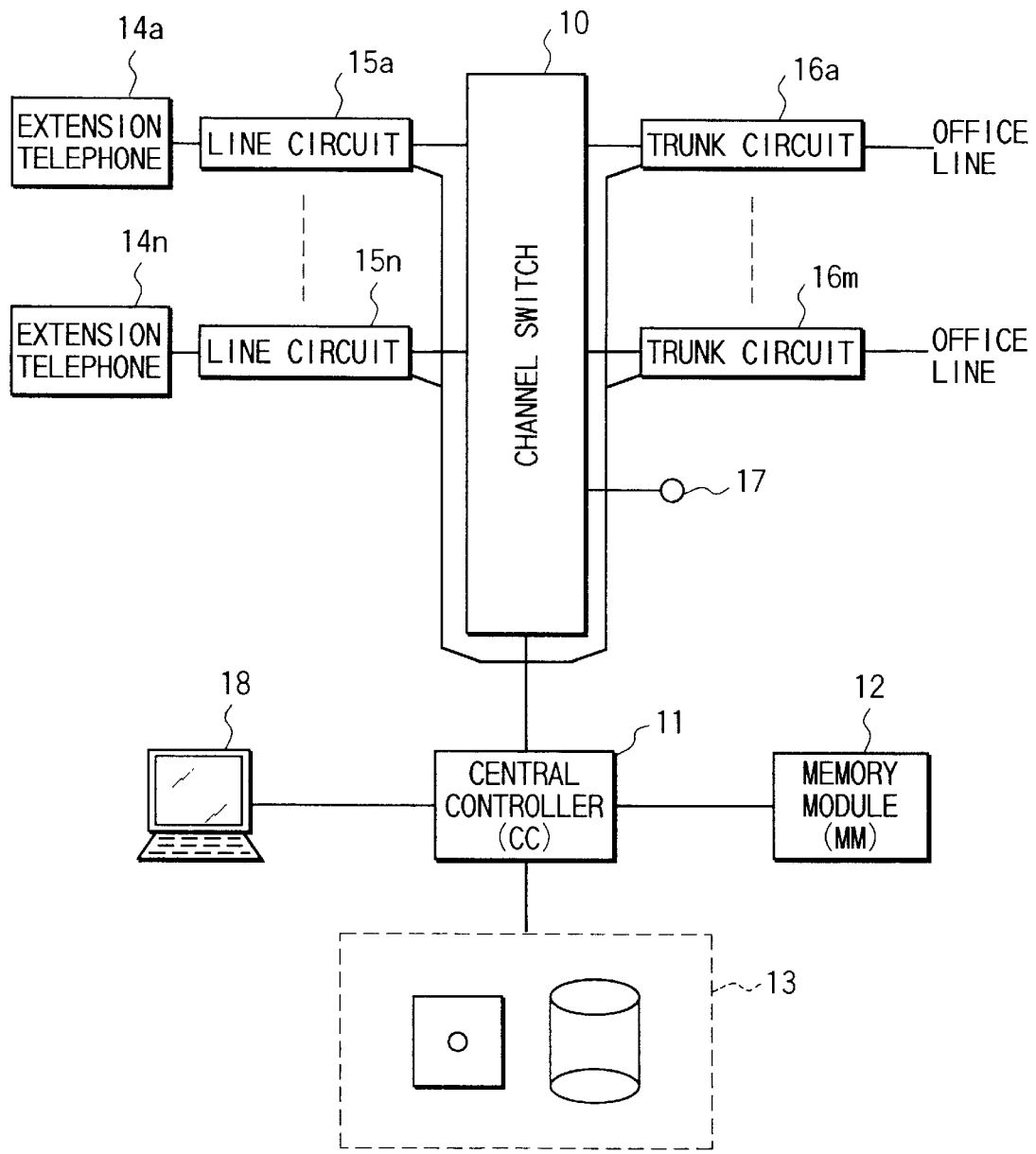
FIG. 4 is a block diagram showing the structure of a private branch exchange according to an embodiment of the present invention.

Embodiments of the present invention will now be described in detail with reference to the accompanying drawings. FIG. 4 is a block diagram showing the structure of a private branch exchange according to the embodiment of the invention.

In FIG. 4, a channel switch 10 performs switching operations between an extension and an outside line or between extensions. A central controller 11 controls the entire exchange including the channel switch 10. A memory unit 12 comprises a ROM, a RAM, etc. and stores control programs, system data and extension data. An external memory device 13 comprises a floppy disk drive or a hard disk drive, and it is used to save the information to be stored in the memory unit 12 or to store drive records of the exchange.

Extension telephones 14a to 14n are connected to the channel switch 10. Line circuits 15a to 15n serve as interfaces for connection between the channel switch 10 and extension telephones 14a to 14n. Trunk circuits 16a to 16m serve as interfaces between the channel switch 10 and outside lines, e.g. office lines.

A signal generator 17 generates various tone signals. A maintenance terminal 18 has a display and a keyboard and is connected to the central controller 10 via an interface (not shown). The terminal 18 is used to set data in the exchange or input various commands.

(First Embodiment)

Figure 5:
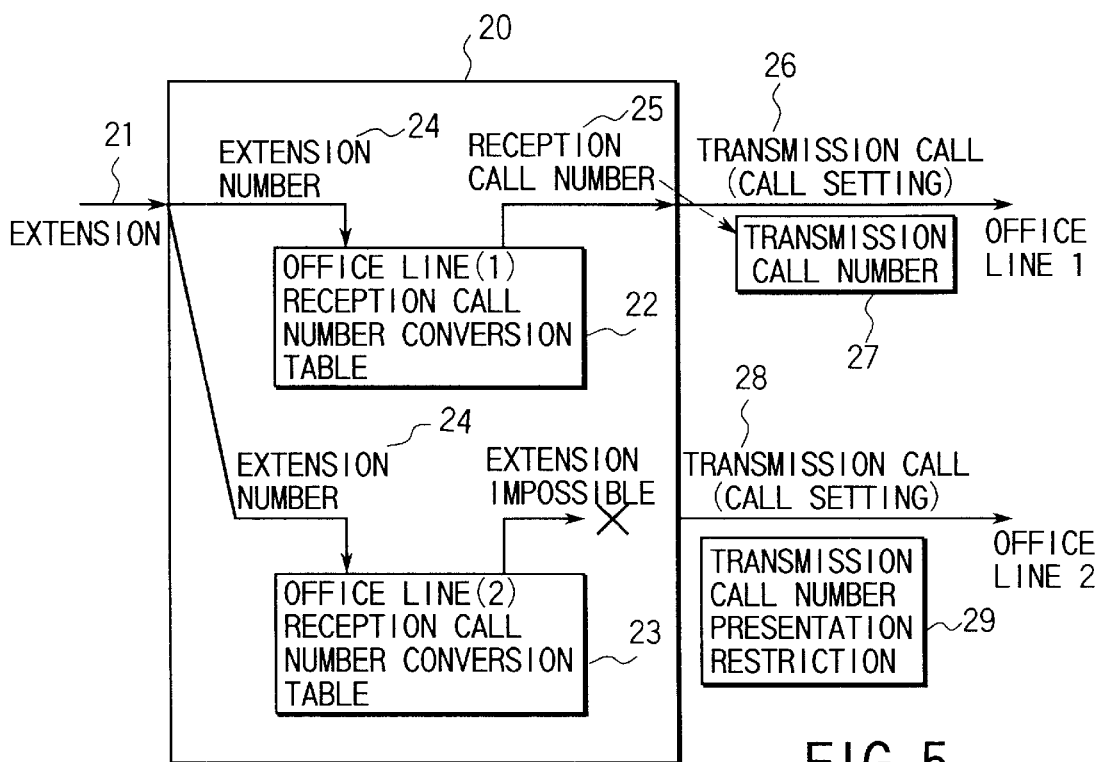
FIG. 5 is a diagram illustrating a process for providing a caller number which actually permits a callback in a first embodiment of the present invention.

FIG. 5 schematically shows a process 20 for providing a caller number which actually permits a callback in a first embodiment of the present invention. A call signal 21 from the extension may be an analog signal or a digital signal, depending on the type of the extension. The memory unit 12 stores an office line (1) called number conversion table 22 for converting a call signal received in connection with an office line 1, to an extension number of the call reception side, and an office line (2) called number conversion table 23 for converting a call signal received in connection with an office line 2, to an extension number of the call reception side. A called number 25 corresponding to the extension number 24 of the extension which transmits a call is extracted from the office line (1) called number conversion table 22. A transmission call signal 26 is sent to the office line 1. The transmission call signal 26 is termed "call setting signal" in the integrated services digital network. A caller number 27 is included in the transmission call signal 26. A transmission call signal 28 is sent to the office line 2. The transmission call signal 28 is termed "call setting signal" in the integrated services digital network. A caller number presentation restriction 29 is included in the transmission call signal 28 and is termed "caller number presentation restriction information element" in the integrated services digital network.

Figure 6:
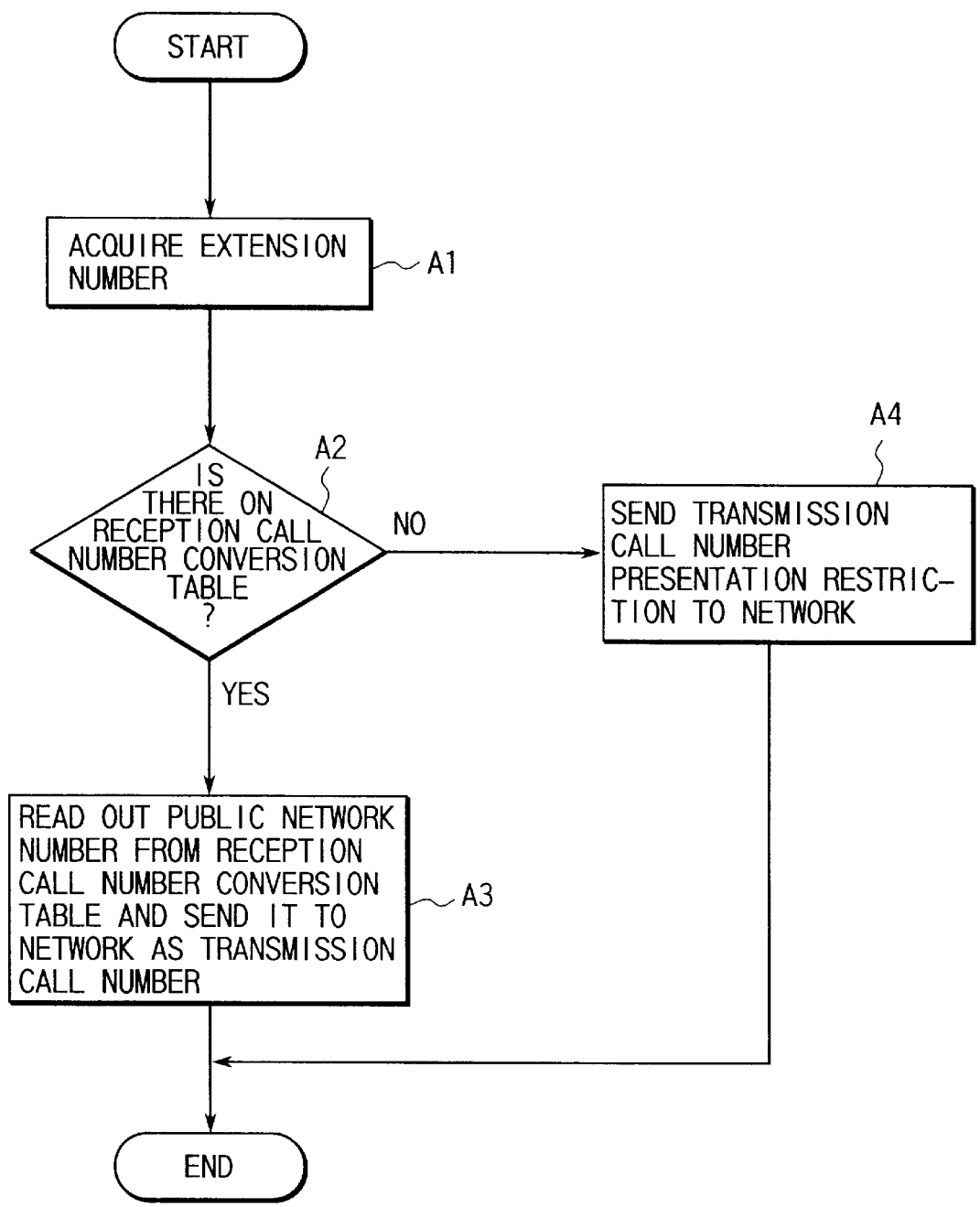
FIG. 6 is a flow chart illustrating an operation for transmitting a call from an extension to office line 1.

An operation of transmitting a call from the extension to the office line 1 will now be described with reference to FIGS. 5 and 6. FIG. 6 is a flow chart illustrating the operation of transmitting a call from the extension to the office line 1.

When the extension has transmitted a call to the office line 1, the private branch exchange obtains the extension number 24 of the extension which has transmitted the call (step A1). Using the extension number 24 as a key, the private branch exchange searches the office line (1) called number conversion table 22 and determines whether or not a called number corresponding to the extension number 24 can be extracted (step A2). If the called number 25 has been extracted, this number is employed as caller number 27 of the extension and it is included in the transmission call signal 26 delivered to the office line 1 and transmitted to the network (step A3). Since the caller number 27 on the office line 1 is permitted in the network, the number 27 passes the network verification and is transmitted to the counter-side terminal. If a callback is made from the counter-side terminal with use of the received caller number 27, the called number thereof can be converted to the extension number 24 by the office line (1) called number conversion table 22. Thus, the callback can be received by the extension which first transmitted the call.

If no called number could be extracted from the following process is performed. As in the above case, when the extension has transmitted a call to the office line 2, the private branch exchange searches the office line called number conversion table 23, using the extension number 24 as key, and determines whether the called number corresponding to the extension number 24 can be extracted (step A2). If the called number 25 cannot be extracted, the private branch exchange transmits to the network a transmission call 28 in which a caller number presentation restriction is set (step A4). In this case, the network does not effect verification or supplementation of the caller number, nor does it inform the caller number to the counter-side terminal. Accordingly, the counter-side party will not erroneously make a callback.

Figures 7, 9:
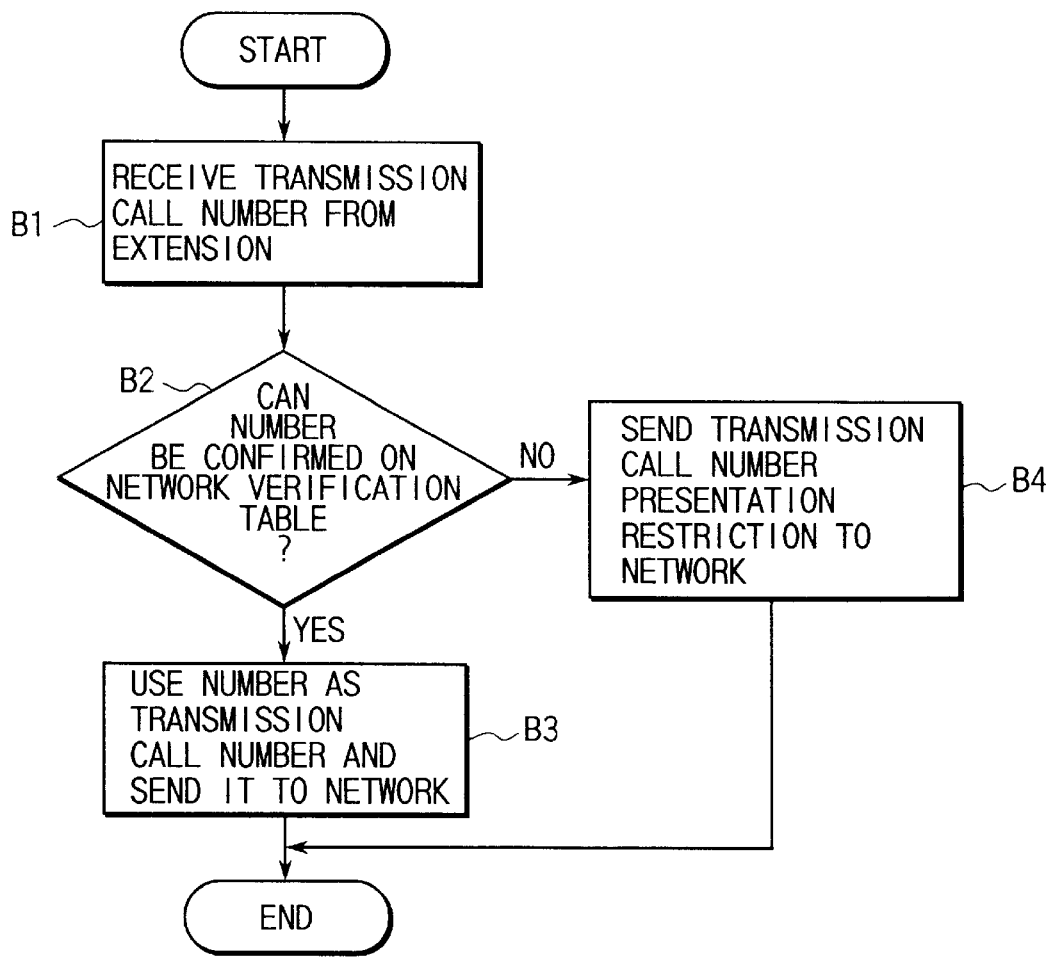
FIG. 7 shows an example of the structure of a called number conversion table.
FIG. 9 is a flow chart illustrating an operation for transmitting a call from an extension to the integrated services digital network.

FIG. 7 shows an example of the structure of the called number conversion table. In the called number conversion table shown in FIG. 7, specific called numbers are set for the extension call numbers so that the called numbers and extension call numbers are associated in units of a circuit or a trunk group.

According to the present embodiment, a caller number, with which a callback can be actually made, is easily informed with use of data of an already available called number conversion table, without preparing special data. In addition, when a caller number which permits a callback cannot be extracted, a caller number presentation restriction is transmitted. It is thus possible not to positively inform the caller number.

(Second Embodiment)

Figure 8:
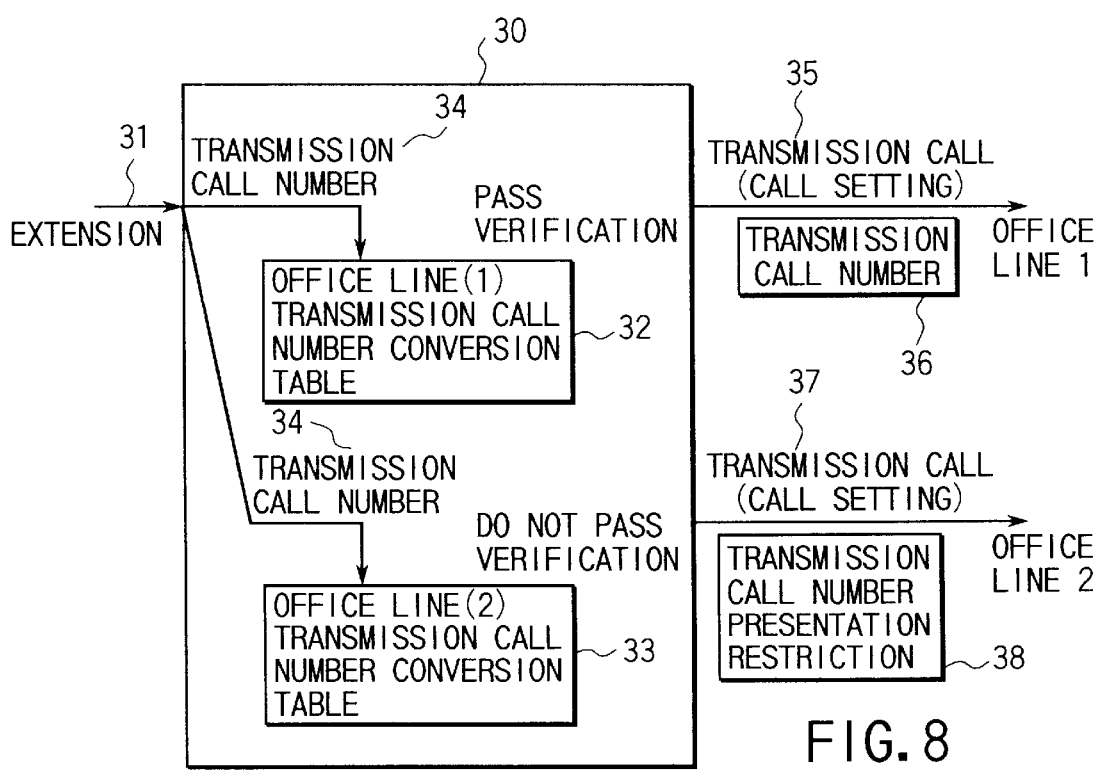
FIG. 8 is a diagram illustrating a process for providing a caller number which actually permits a callback in a second embodiment of the present invention.

FIG. 8 schematically shows a process 30 for providing a caller number with which a callback can actually be made in a second embodiment of the present invention. A call signal 31 from the extension may be an analog signal or a digital signal, depending on the type of the extension. The memory unit 12 stores a table including caller numbers which can pass the network verification with respect to the office line 1, and an office line (2) caller number conversion table 33 including caller numbers which can pass the network verification with respect to the office line 2. Since the caller numbers which can pass the network verification can be known in advance with reference to contracts with the network, the tables 32 and 33 are prepared on the basis of the data on the contracts. The caller number 34 corresponds to the extension which transmits a call and the validity of the caller number of the extension is confirmed in advance. The caller number 34 may be a number with which a call can be directly received from the network by direct dial-in, or a number with which a call may be received on the basis of a sub-address, or a representative number with which a call can be forwarded to the extension via a switchboard. Where the extension matches the integrated services digital network, the caller number 34 may be transmitted from the extension. Alternatively, the caller number 34 may be extracted in the private branch exchange by searching data from the location of the extension or extension number. A transmission call signal 35 is transmitted to the office line 1 and is termed "call setting signal" in the integrated services digital network. The caller number 26 is included in the transmission call signal 35. A transmission call signal 37 is transmitted to the office line 2 and is termed "call setting signal" in the integrated services digital network. A caller number presentation restriction 38 is included in the transmission call signal 37 and is termed "caller number presentation restriction information element" in the integrated services digital network.

An operation of transmitting a call from the extension to the integrated services digital network will now be described with reference to FIGS. 8 and 9. FIG. 9 is a flow chart illustrating the operation of transmitting a call from the extension to the integrated services digital network. If the extension transmits a call, the private branch exchange receives a caller number from the extension (step B1). In step B1, the caller number may not be obtained from the extension. The private branch exchange may obtain the caller number by extracting it from the location of the extension or extension number. Using as a key the caller number 34 informed by the extension or the caller number 34 extracted by the private branch exchange from the location of the extension or extension number, the office line (1) caller number conversion table 32 including caller numbers allowable in office line 1 is searched and it is determined whether the caller number 34 can pass the network verification in office line 1 (step B2). If there is a caller number which can pass the network verification, this number is included in the transmission call signal 35 as caller number 36 and sent to the network (step B3). Since the caller number 36 is a number allowed in the office line 1 by the network, it passes the network and is transmitted to the counter-side terminal. If a callback is made with use of the caller number 3b received from the counter-side terminal, it reaches the private branch exchange and is connected to the extension, which first transmitted the call, by the call reception method informed by the private branch exchange.

If the caller number 34 corresponding to the extension failed to pass the network, the following process is performed. Using as a key the caller number 34 informed by the extension or the caller number 34 extracted by the private branch exchange from the location of the extension or extension number, the office line (2) caller number conversion table 33 including caller numbers allowable in office line 2 is searched and it is determined whether the caller number 34 can pass the network verification in office line 2 (step B2). If the caller number 34 is a number which cannot pass the network verification, the private branch exchange sends to the network the transmission call signal 37 in which the caller number presentation restriction is set (step B4). In this case, the network does not effect verification or supplementation of the caller number, nor does it inform the caller number to the counter-side terminal. Accordingly, the counter-side party will not erroneously make a callback.

FIG. 10 shows an example of the structure of the caller number verification table. Unlike the called number conversion table, this table has only verification pass numbers and there is no need to associate these numbers with the extension numbers.

According to the present embodiment, the following problems can be solved. The caller number, which is preset in the private branch exchange or inform by the extension and with which a callback can be made with respect to a normally connected office line, may be rejected by the network verification function, depending on the office line selected at the time of call transmission by the office lien select function of the private branch exchange. Besides, if the caller number is supplemented with the default number held for each interface and received by the counter-side terminal, it cannot be used for the callback.

FIGS. 11A and 11B show display examples on the display of the reception terminal in the case where the presentation restriction is inform.

In the case of the presentation restriction, the presentation restriction can be understood by a display such as "CALLER NUMBER RESTRICTED" or "CALLER NUMBER NOT PROVIDED". If the number is informed, the caller number may be actually informed, or only the fact of the provision of number may be informed.

In the first and second embodiments, the presentation restriction of the call from the extension is described. The presentation restriction, however, is not limited to the call from the extension but is applicable to the call from an exclusive line connected to the private branch exchange.

In this case, in FIGS. 5 and 8, the exclusive line, like the extension, is connected to the private branch exchange, and the operation is substantially the same as that in the first and second embodiments. In the case of the extension, the caller number is informed to the private branch exchange. In the case of the exclusive line, the connected party number is informed.

In the first and second embodiments, the caller number presentation restriction is sent only in the case where the called number cannot be extracted by the conversion table or in the case where verification failed on the verification table. The invention is not limited to this, and the caller number presentation restriction may be sent in all cases. The same applies to the exclusive line.

Needless to say, the present invention is not limited to the above embodiments and various modifications may be made without departing from the spirit of the invention.

What is claimed is:

1. A private branch exchange comprising:
   at least one extension circuit to which an extension terminal is connected via an extension line;
   at least one trunk circuit connected to an office line;
   memory means for storing information on a relationship between an extension number relating to the extension circuit and information relating to a reception call number, in association with the trunk circuit, the information relating to the reception call number enabling a callback to the extension terminal; and
   sending means for sending the information relating to the reception call number as a caller number to the office line, when a call is transmitted from the extension terminal to the office line via the trunk circuit,
   wherein in a case where a transmission call request is issued from the extension terminal to the office line, with one of the trunk circuit selected, if the memory means does not store information relating to a reception call number corresponding to an extension number of the extension terminal relating to the call, the sending means sends information on caller number presentation restriction to the office line.

2. The private branch exchange according to claim 1, wherein when the call is issued from the extension terminal, the sending means determines whether the reception call number corresponding to the extension circuit connected to the extension terminal relating to the call is stored.

3. The private branch exchange according to claim 2, wherein if the reception call number corresponding to the extension number is stored in the memory means, the reception call number is issued as a caller number to the communication network.

4. The private branch exchange according to claim 1, wherein the memory means stores information on the caller number permissible in the communication network, and
   when a call has been issued from the extension terminal, the sending means determines, with use of the information stored in the memory means, whether the caller number corresponding to the extension number of the extension terminal relating to the call is a caller number permissible in the communication network.

5. The private branch exchange according to claim 4, wherein if the sending means has determined that the reception call number corresponding to the extension number is not a permissible caller number, the sending means sends a caller number presentation restriction to the communication network.

6. The private branch exchange according to any one of claim 1 or 2–5, wherein at least an exclusive line is included, and the sending means determines whether or not the reception call number corresponding to the exclusive line is obtained with respect to the caller number when a call is sent from the exclusive line to the communication network, and if the reception call number is obtained, the reception call number corresponding to the extension number is employed as the caller number and information relating to this caller number including transmission call information is transmitted to the communication network.

7. A private branch exchange comprising:
   at least one extension circuit to which an extension terminal is connected via an extension line;
   at least one trunk circuit connected to an office line;
   memory means for storing information on a relationship between an extension number relating to the extension circuit and information relating to a connected party number, in association with the trunk circuit, the information relating to the connected party number enabling a callback to the extension terminal; and
   sending means for sending the information relating to the connected party number to the office line, when the extension terminal responds to a call received by the extension circuit via the trunk circuit,
   wherein in a case where a response request is issued from one of the extension terminals, if the memory means does not store information relating to the connected party number corresponding to an extension number of the extension terminal relating to the response, the sending means sends information on connected party number presentation restriction to the office line.

8. The private branch exchange according to claim 7, wherein when the extension terminal has responded to the reception call, the sending means determines whether or not the reception call number corresponding to the extension circuit connected to the extension terminal associated with the reception call is stored.

9. The private branch exchange according to claim 8, wherein if the reception call number corresponding to the extension number is stored in the memory means, the reception call number is sent to the communication network as the connected party number.

10. The private branch exchange according to claim 7, wherein the memory means stores information relating to a connected party number permissible in the communication network, and the sending means, when the extension terminal has responded to a reception call, determines, with use of information stored in the memory means, whether the connected party number corresponding to the extension number of the extension terminal relating to the reception call is a connected party number permissible in the communication network.

11. The private branch exchange according to claim 10, wherein when the sending means has determined that the reception call number corresponding to the extension number is not a permissible connected party number, the sending means sends a connected party number presentation restriction to the communication network.

12. The private branch exchange according to any one of claim 7 or 8–11, wherein at least an exclusive line is included, and in a case where the exclusive line responds to a reception call, the sending means determines whether or not a number, which is preconfirmed to function as the reception call number for callback associated with the exclusive line, can be obtained with respect to the connected party number if the exclusive line has responded to the reception call, and if the sending means has determined that said reception number is obtained, the number which is preconfirmed to function as the reception call number for callback is employed as a connected party number and information on the connected party number is included in response information and transmitted to the communication network.

13. In a private branch exchange including at least two public lines and having a function of interconnecting the public lines automatically or manually, for every call incoming from a first public line and outgoing to a second public line, a caller number presentation restriction is sent to the second public line on an outgoing call side, irrespective of the presence or absence of a caller number received from the first public line on an incoming call side and irrespective of content of a caller number received from the first public line on the incoming call side.

14. In a private branch exchange including at least two public lines and having a function of interconnecting the public lines automatically or manually, for every response by a first public line on an outgoing call side to a call received from a second public line on an incoming call side, a connected party number presentation restriction is sent to the second public line, irrespective of the presence or absence of a connected party number received from the first public line and irrespective of content of a connected party number received from the first public line.

15. A private branch exchange comprising:
at least one extension circuit to which an extension terminal is connected via an extension line;
at least one trunk circuit connected to an office line;
memory means for storing information on a relationship between an extension number relating to the extension circuit and information relating to a reception call number, in association with an office line, the information relating to the reception call number enabling a callback to the extension terminal; and
sending means for sending the information relating to the reception call number as a caller number to the office line, when a call is transmitted from the extension terminal to the office line via the trunk circuit,
wherein in a case where a transmission call request is issued from the extension terminal to the office line, if the memory means does not store information relating to a reception call number corresponding to an extension number of the extension terminal relating to the call, the sending means sends information on caller number presentation restriction to the office line.

16. A private branch exchange comprising:
at least one extension circuit to which an extension terminal is connected via an extension line;
at least one trunk circuit connected to an office line;
memory means for storing information on a relationship between an extension number relating to the extension circuit and information relating to a connected party number, in association with an office line, the information relating to the connected party number enabling a callback to the extension terminal; and
sending means for sending the information relating to the connected party number to the office line, when a reception call transmitted from the extension terminal to the extension circuit via the trunk circuit is responded,
wherein in a case where a response request is issued from one of the extension terminals, if the memory means does not store information relating to the connected party number corresponding to the extension number of the extension terminal relating to the response, the sending means sends information on connected party number presentation restriction to the office line.

* * * * *